US007207668B2

(12) United States Patent
Jones et al.

(10) Patent No.: US 7,207,668 B2
(45) Date of Patent: Apr. 24, 2007

(54) INK SUPPLY CONTAINER FOR HIGH SPEED SOLID INK PRINTERS

(75) Inventors: Brent R. Jones, Tualatin, OR (US); Patrick B. Justice, Portland, OR (US)

(73) Assignee: Xerox Corporation, Stamford, CT (US)

( * ) Notice: Subject to any disclaimer, the term of this patent is extended or adjusted under 35 U.S.C. 154(b) by 326 days.

(21) Appl. No.: 10/806,008

(22) Filed: Mar. 22, 2004

(65) Prior Publication Data

US 2005/0206700 A1 Sep. 22, 2005

(51) Int. Cl.
*B41J 2/175* (2006.01)
*B41J 2/195* (2006.01)
*G01D 11/00* (2006.01)

(52) U.S. Cl. .............................. 347/88; 347/99; 347/7

(58) Field of Classification Search ................. 347/88, 347/99, 7, 19, 84, 85, 95, 58, 86
See application file for complete search history.

(56) References Cited

U.S. PATENT DOCUMENTS 4,593,292 A 6/1986 Lewis
4,631,557 A 12/1986 Cooke et al.
5,146,785 A * 9/1992 Riley .......................... 73/313
5,386,224 A * 1/1995 Deur et al. ..................... 347/7
5,392,065 A * 2/1995 Suzuki ........................ 347/88
5,406,315 A * 4/1995 Allen et al. ..................... 347/7
5,489,925 A * 2/1996 Brooks et al. ................. 347/6
5,502,467 A * 3/1996 Hoisington et al. ............ 347/6
5,694,156 A * 12/1997 Hoisington et al. ............ 347/7
5,734,402 A 3/1998 Rousseau et al.
5,788,833 A * 8/1998 Lewis et al. ................ 205/787
5,861,903 A 1/1999 Crawford et al.
5,881,646 A * 3/1999 Nagata et al. .............. 101/487
5,917,528 A 6/1999 Grellmann et al.
5,975,690 A 11/1999 Grellmann et al.
6,056,394 A * 5/2000 Rousseau et al. ............. 347/88
6,089,686 A * 7/2000 Thornton et al. .............. 347/7

(Continued)

FOREIGN PATENT DOCUMENTS

EP 0 571 127 11/1993

(Continued)

*Primary Examiner*—Stephen Meier
*Assistant Examiner*—Leonard Liang
(74) *Attorney, Agent, or Firm*—Maginot, Moore & Beck

(57) ABSTRACT

A novel solid ink supply container adapted for use with solid ink printers, at least includes: removable housing adapted to receive solid ink masses, the housing adapted to be coupled to at least one printhead; a heater subsumed by the housing, the heater adapted to liquefy solid ink masses; an outlet port adapted to facilitate fluid ink transfer to at least one printhead; an ink sensor adapted to sense the amount of ink in the supply container; at least one electronic storage device attached to the housing, the electronic storage device adapted to exchange printer operation information with the printer to which the ink supply container is attached; and electrical contacts attached to the housing; the electrical contacts adapted to exchange power and information between the printer, and exchange power and information between the storage device and other components of the housing. The ink supply container is adapted to be recycled by returning a depleted container to a recycling operation and receiving a replenished container for installation in the printer.

6 Claims, 3 Drawing Sheets

U.S. PATENT DOCUMENTS

| | | | | |
|---|---|---|---|---|
| 6,550,881 | B1 * | 4/2003 | Phillips | 347/7 |
| 6,565,200 | B1 | 5/2003 | Jones | |
| 6,739,689 | B2 * | 5/2004 | Choi | 347/19 |
| 6,883,905 | B2 * | 4/2005 | Kimura et al. | 347/85 |
| 6,969,136 | B1 * | 11/2005 | Matsumoto et al. | 347/7 |
| 2003/0043231 | A1 * | 3/2003 | Byers et al. | 347/43 |

FOREIGN PATENT DOCUMENTS

| | | |
|---|---|---|
| EP | 0 789 322 | 8/1997 |
| EP | 0 873 873 | 10/1998 |

* cited by examiner

INK SUPPLY CONTAINER FOR HIGH SPEED SOLID INK PRINTERS

FIELD OF THE INVENTION

The present invention generally relates to high speed printers which have one or more printheads that receive molten ink heated from solid ink blocks or pellets. More specifically, the present invention relates to improving the ink container design and functionality.

BACKGROUND OF RELATED ART

So called "solid ink" printers offer many advantages over many other types of high speed or high output document reproduction technologies such as laser and inkjet approaches. These often include higher document throughput (i.e., the number document reproduced over a unit of time), fewer mechanical components needed in the actual image transfer process, fewer consumables to replace, sharper images, as well as being more environmentally friendly.

A schematic diagram for a typical solid ink printing device is illustrated in FIG. 1. The solid ink printer 100 has a solid ink reservoir 110 which receives solid ink blocks or pellets which remain in solid form at room temperatures. The ink stock can be refilled by a user by simply adding more as needed to the reservoir 110. Separate reservoirs, or at least separate reservoir components, are used for color printing. For, example, only black solid stock is needed for monochrome printing, while solid ink stock of black, cyan, yellow and magenta are typically needed for color printing.

An ink heater 120 melts the ink by raising the temperature of the ink sufficiently above its "freezing point." The liquefied ink is supplied to a group of print heads 130 by gravity, pump action, or both. In accordance with the image to be reproduced, and under the control of a printer controller 180, a rotating print drum 140 receives ink dots representing the image pixels to be transferred to printing stock 170 from a sheet feeder 160. To facilitate the image transfer process, a pressure roller 150 presses the printing stock 170 against the print drum 140, whereby the ink is transferred from the print drum to the printing stock. The temperature of the ink can be carefully regulated so that the ink solidifies just after the image transfer.

Printer operation thermal set points additionally influence image transfer quality and durability, and are related to the ink properties and ink thermal behavior. As an example, the drum is held at a predetermined temperature range to allow just the right ink drop spread and transfer to media, and the pre-heater warms media prior to image transfer so the ink properly adheres. When these parameters are programmed into the printer without a means to couple them to a specific ink formulation, composition of ink used over the product life is highly constrained. Flexibility in post product release ink formulation change is minimal or non existent. This inflexibility in permitting ink evolution for an existing printer product is a limitation of the prior art for solid ink storage and delivery systems.

While there may be advantages to the use of solid ink printers compared to other image reproduction technologies, printer architecture, high speed and voluminous printing sometimes creates problems not satisfactorily solved by the prior art solid ink printing approaches. To meet the large ink volume requirement, the ink reservoirs are typically either able to be replenished by loading pellets or ink chunks to the reservoir throughout operation of the printer, or multiple ink reservoirs supplying the same color are linked so that when one container is exhausted, the printer automatically switches to another supplied reservoir of the same color.

Replenishing ink by the customer can lead to loading the wrong ink color or the wrong ink formulation for the particular reservoir. In response, prior art solid ink printers often employ a complicated system of ink shape or container interlocks to discourage improper ink pellet/chunk placement. There are also problems associated with insuring that the ink properly dispenses out of the reservoir, sensing the level of ink present in the reservoir, and others owing to the cost and complexity of such features. In summary, solid ink in pellet form provides many advantages and may be easier to refill, but pose a greater risk of loading the wrong ink. Large ink blocks with special shapes (that are matched by the correct reservoir or reservoir compartment) may reduce ink color mistakes but might carry more cracks and structural flaws and would be very vulnerable to handling damage, making them difficult to handle and load at times.

In addition, some forms of ink containers for solid ink printers may not encourage recycling due to the tendency of consumers to treat them as disposable items used only for packaging for transport and storage of ink.

There is also a desire on the part of consumable suppliers to efficiently obtain information related to the printer activity so that the customer can be better served in the future.

SUMMARY

In view of the above-identified problems and limitations of the prior art and alternate ink and ink loader forms, the present invention provides a solid ink supply container adapted for use with solid ink printers. The container at least includes: removable housing adapted to receive solid ink masses, the housing adapted to be coupled to at least one printhead; a heater subsumed by the housing, the heater adapted to liquefy solid ink masses; an outlet port adapted to facilitate fluid ink transfer to at least one printhead; an ink sensor adapted to sense the amount of ink in the supply container; at least one electronic storage device attached to the housing, the electronic storage device adapted to exchange printer operation information with the printer to which the ink supply container is attached; and electrical contacts attached to the housing; the electrical contacts adapted to exchange power and information between the printer, and exchange power and information between the storage device and other components of the housing. The electronic storage device can be in the form of an ID chip or the like, to further provide to printer, information about the ink in use in the container, such as the color table, melt temperature, and other printer process parameters, by similar electrical connection means.

The present invention also provides a method of replacing solid ink for a solid ink printer, the method at least including: providing at least one solid ink supply container at least including removable housing adapted to receive solid ink masses, the housing adapted to be coupled to at least one printhead, a heater subsumed by the housing, the heater adapted to liquefy solid ink masses, the housing including a cartridge ID and/or information storage device adapted to transfer required ink cartridge and/or printer operation information to the printer, an ink level sensor, a fluid outlet port attached to the housing, a valve adapted to permit or inhibit flow of melted ink from the outlet port, an electronic storage device attached to the housing, the electronic storage device adapted to store printer operation information transferred to it by a printer to which the ink supply container is attached, and electrical contacts attached to the housing; the electrical contacts adapted to exchange power and information between the printer, and exchange power and information between the storage device and other components of the housing; removing the container from the printer when container ink is depleted; recycling the container at a recycling operation; receiving a replacement container from the recycling operation with new solid ink therein; and installing the replacement container for use with the printer.

Electrical and ink transfer port connections would preferably be made automatically as the cartridge is mounted in the system, but could be accomplished independently or manually. Likewise, the preferred incorporation of a valve function to suspend the flow of molten ink could be an automatically or manually actuated mechanical device or a thermal "freeze off" passage where ink returning to the solid state would prevent flow. The valve is not necessary to accomplish the desired basic functions of the cartridge.

Electrical connections between the ink supply container and the printer enable information exchange. Information exchange could be unidirectional or bidirectional depending on the functionality intended for the recyclable cartridge. Ink information, cartridge information and printer operational parameter information influenced by properties of the ink provided in the cartridge, including printer thermal set points, can be programmed into an ID or information storage device housed in the cartridge. This or another chip could receive and store usage, operation and service data provided by the printer for retrieval when the cartridge is recycled.

The present invention is fundamentally an ink supply cartridge for solid ink printers that incorporates a built-in heater to facilitate the process of transferring ink to one or more printheads. The many additional described features of this cartridge, which can be selectively incorporated individually or in any combination, enable many additional printer system opportunities, including better usage profile and consumption information for "pay by the print" type marketing and ink load capability as an alternative (upgrade) or addition (volume/delivery supplement) to more typical ink delivery systems.

BRIEF DESCRIPTION OF THE DRAWINGS

Features of the present invention will become apparent to those skilled in the art from the following description with reference to the drawings, in which.

DETAILED DESCRIPTION

The term "printer" refers, for example, to reproduction devices in general, such as printers, facsimile machines, copiers, and related multi-function products, and the term "print job" refers, for example, to information including the electronic item or items to be reproduced. References to ink delivery or transfer from an ink cartridge or housing to a printhead are intended to encompass the range of intermediate connections, tubes, manifolds and/or other components that may be involved in a printing system but are not immediately significant to the present invention.

Figure 1:
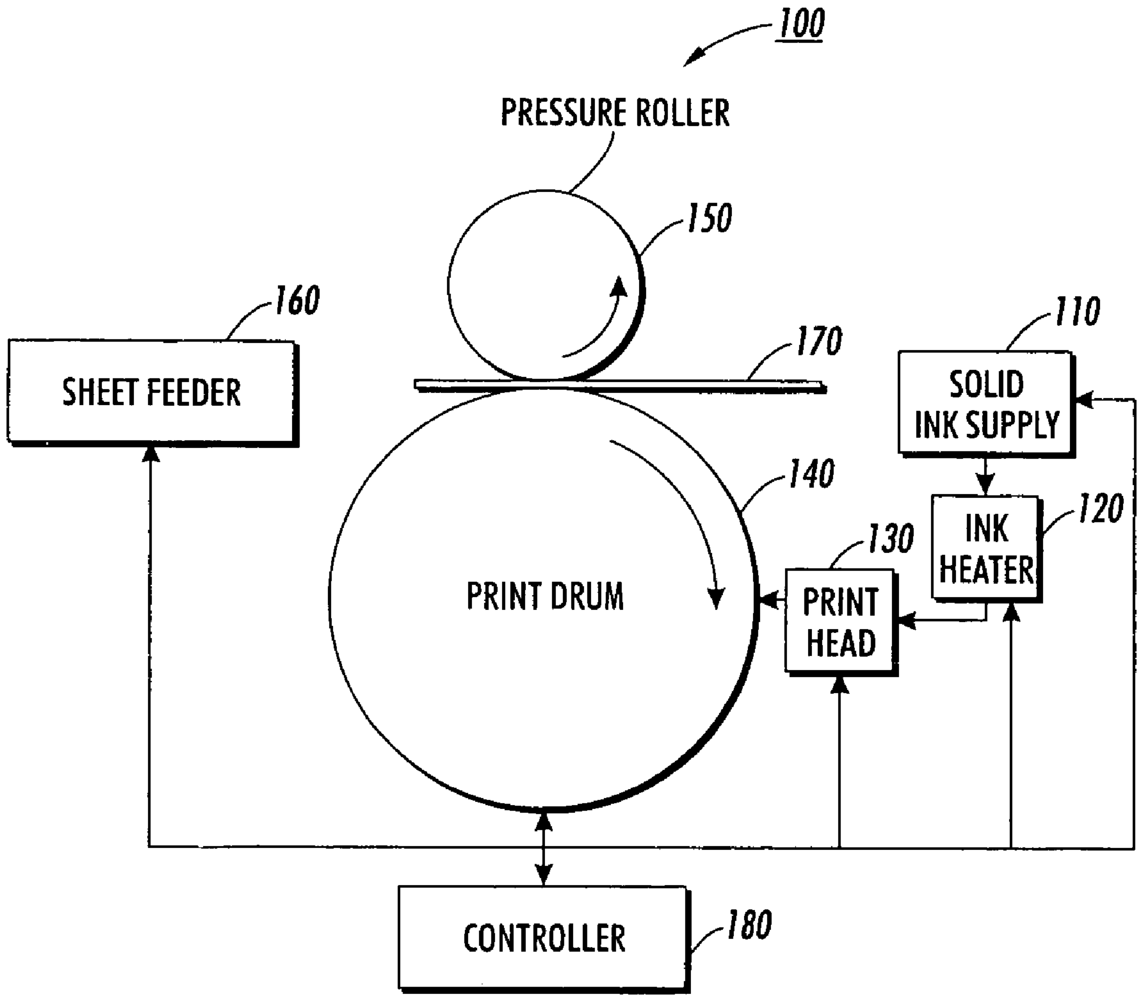
FIG. 1 PRIOR ART
FIG. 1 is a general schematic diagram of a prior art high speed, solid ink printer.
Figure 2:
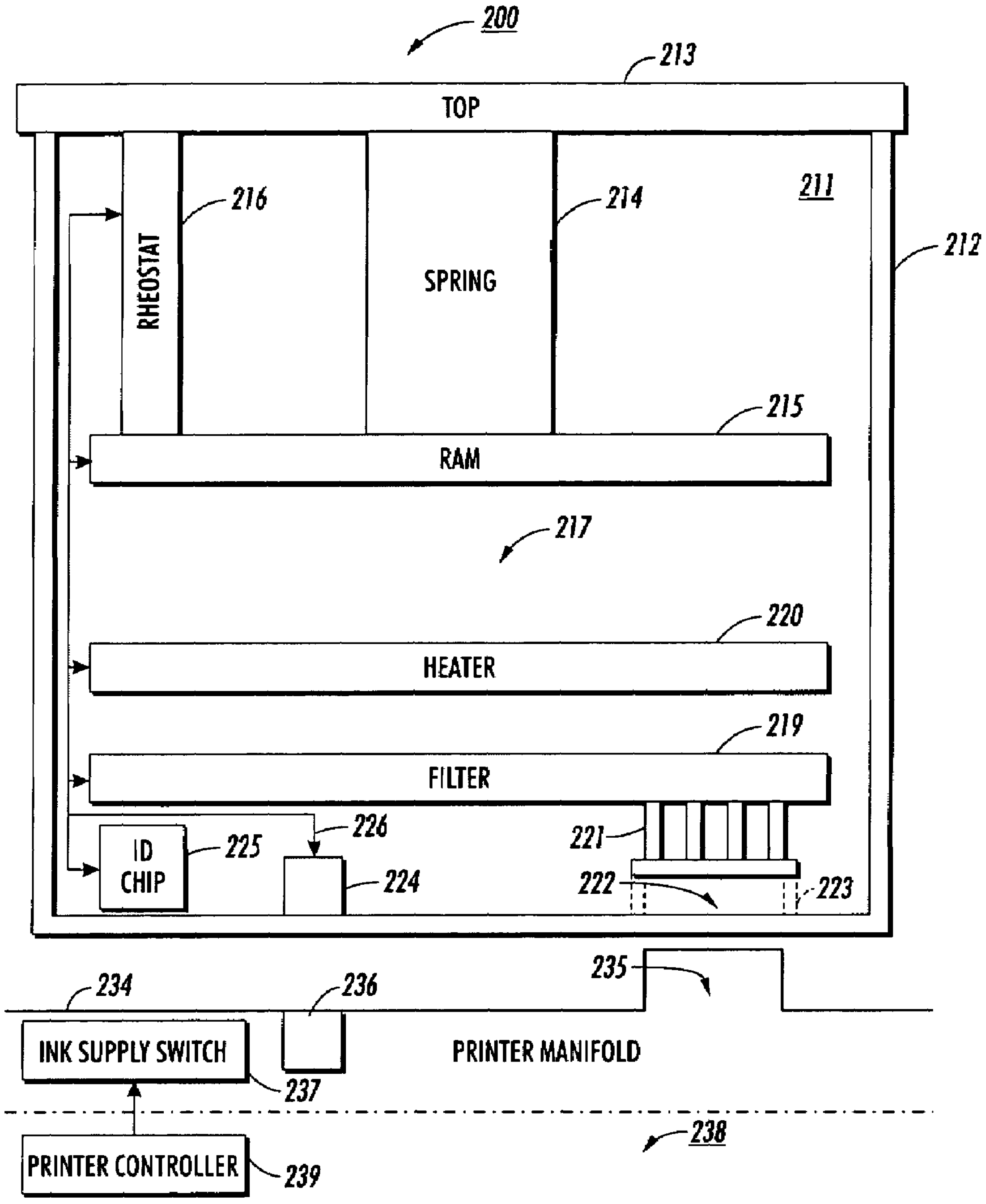
FIG. 2 is a cutaway view of the present-inventive container for receiving solid ink stock, converting the solid ink into liquid form, and supplying the liquid ink to a manifold or other reservoir for delivery to printheads.

The general components of a solid ink printer have been described supra. The present invention includes a multi-function ink supply container, and a method and system for incorporating the same. Designed to promote recycling, automatic switching from spent containers to new ones, the elimination of mistakes (e.g., wrong color, etc.) and spills, and to promote the gathering of information concerning the operation of a customer's printer, the present-inventive all encompassing container 211 is illustrated in FIG. 2 as part of a printing system 200.

The novel solid ink supply container 211 incorporates the following functions inside of a housing 212: solid ink storage, supply and refill; automatic ink level sensing; heating the solid ink to liquefy it prior to exiting the container; filtering the ink as needed; storing printer operation information transmitted to the container; and supplying container status information to the printer. Solid ink blocks or cylinders can be loaded into the container by removing a top 213. Other forms of solid ink would also be compatible with the present inventive supply container system, such as ink in powder or pellet form. The top has a spring-loaded ram (elements 214 and 215) used to apply pressure to an ink block when it is placed in a chamber 217 against a porous floor, for example, and the top is engaged. In the preferred embodiment, a rheostat 216 attached to the ram automatically determines the ink level, although those skilled in the art will appreciate that other approaches can be used for automatic ink level sensing, including sensing only when the volume level is low or spent.

A heater 220 sufficiently heats the ink until it liquefies, and then transfers the ink through a filter 219. The filtered ink can be delivered from an output 221 to an input jack 235 of a printer manifold 234. The printer manifold jack 235 fits into a region of the container 222 formed by walls 223, and engages the output 221. Control of the flow of ink can be via the jack 235, or the output 221, or the controlled cycling of powder to the heater 220.

The container 211 also has a contact 224 which is configured to make an electrical connection with a contact 236 on the printer manifold. The contact 224 supplies power and information to a container bus 226 for electrically connecting container components. An electronic storage device 225 such as an ID chip stores identity information regarding the particular container, as well as printer history and operation information.

A variety of printer information can be periodically transferred to the ID chip, such as the cumulative number of copies made, total hours of operation, average length of print jobs, and purchase and service records.

The manifold 234 is attached to the main portion 238 of the printer. A printer controller 239 controls the printer operation, including the flow of ink into the manifold, and the printheads (not shown).

In the preferred embodiment, redundant ink supply containers are used to allow long-term, uninterrupted printing (or printing of especially large print jobs).

Figure 3:
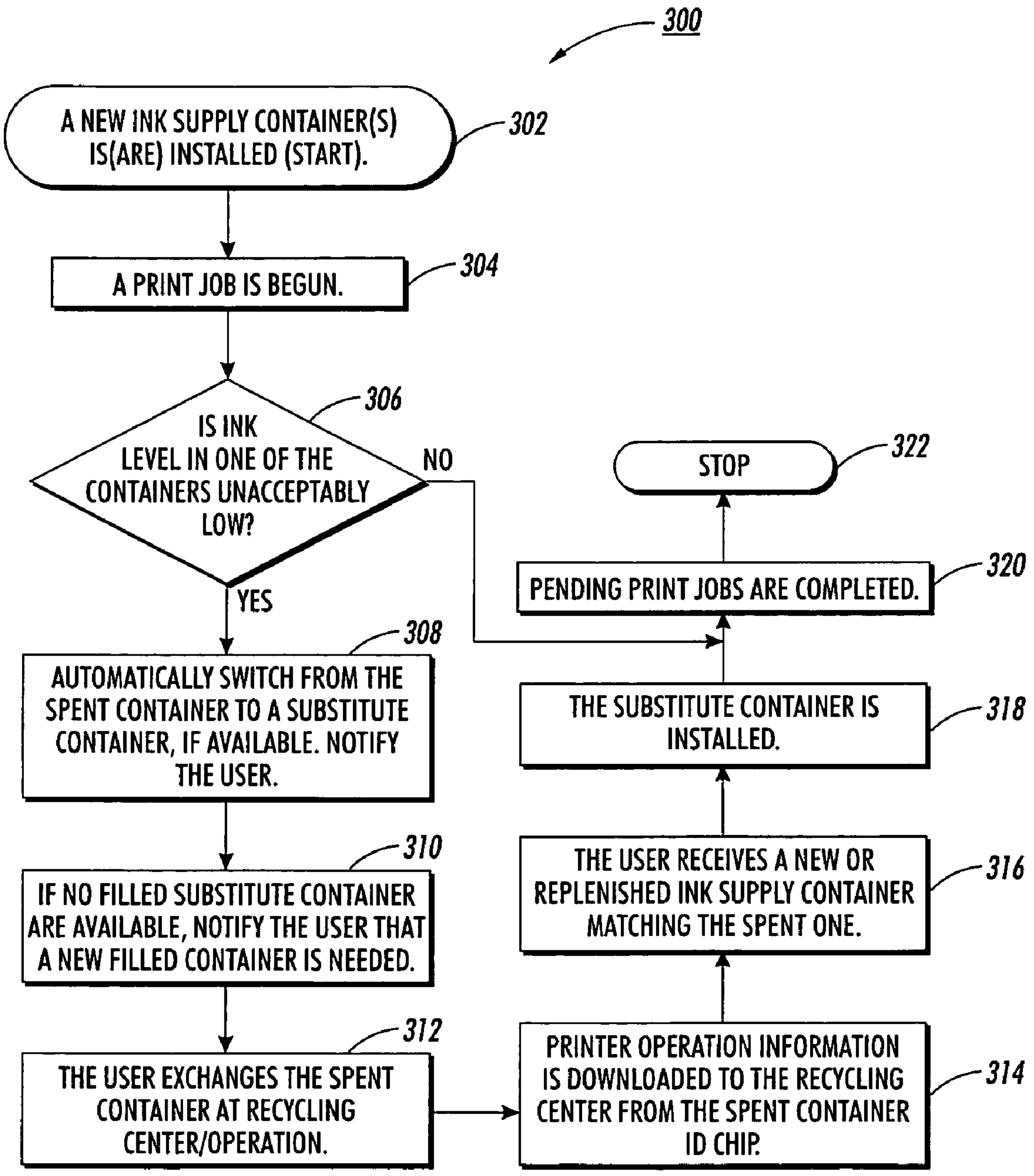
FIG. 3 is a flowchart detailing the basic steps of operation utilizing the present-inventive solid ink supply containers, along with the present-inventive recycling process for exchanging depleted ink supply containers for new or replenished ink supply containers.

A flowchart of the ink supply container operation and recycling processes is shown in FIG. 3. In the example given, the algorithm 300 starts with installing an ink supply container (Step 302). A print job is begun on the solid ink printer in Step 304. Next, the algorithm determines whether the ink level in a container currently dispensing ink is below an acceptable threshold level by receiving an ink level signal from the container. If not, the algorithm jumps to Step 320 to complete any print jobs. Thereafter, the algorithm stops in Step 322.

If however, a container currently dispensing ink has a low ink level, the algorithm advances to Step 308, where the printer automatically causes an ink supply switch 237 to switch from the spent container to a redundant container with the same ink characteristics. If no filled containers are available which contain ink matching that of the spent container, the printer indicates that a new container is needed by a user perceivable signal (Step 310). In Step 312 the user takes the spent container to a recycling center and exchanges the spent container for a new or replenished one. The recycling center can take many forms, including that of a printer supply operation.

The printer history and operation information is downloaded from the spent ink supply container from the ID chip (Step 314). The user receives a new or replenished ink supply container matching the spent one in Step 316. The user can then install the new ink supply container in Step 318. The printer operation is resumed in Step 320 until all print jobs are complete (Step 322).

The ink cartridge 200 can be affixed or locked to engage with the manifold 234 by rotational flange engagement, spring catches, lock-down screw, or numerous other typical methods, not shown.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of storing and melting solid ink for a solid ink printer, said method comprising:

coupling a removable housing in which a solid ink block is stored to at least one printhead;

liquefying with a heater the solid ink block within the housing;

transferring the liquefied ink to the printhead through a fluid outlet port attached to said housing;

receiving printer operation information from a printer controller external to the housing and storing the printer operation information in an electronic storage device within said housing;

providing a plurality of solid ink supply containers;

coupling one solid ink supply container in the plurality of ink supply containers to a printhead to provide liquid ink from the ink supply container;

automatically detecting a low level of ink in the one solid ink supply container coupled to the printhead;

automatically switching from the one solid ink supply container to another one of the solid ink supply containers in the plurality in response to detection of a low ink level in the solid ink supply container coupled to the printhead;

applying pressure with a spring-biased ram to the solid ink block to move a portion of the solid ink block into contact with the heater for liquefying the solid ink block;

coupling a rheostat to the spring-biased ram; and detecting the low ink level with the rheostat.

2. A solid ink supply container adapted for use with solid ink printers, said container component comprising:

a housing for installing within a solid ink printer, a solid ink block being stored within said housing, said housing being coupled to at least one printhead;

a heater within said housing, said heater for liquefying said solid ink block within said housing;

an outlet port adapted to facilitate transfer of said liquefied ink to the at least one printhead coupled to the housing;

an ink sensor for determining an amount of ink in said housing;

at least one electronic storage device within said housing, said electronic storage device being coupled to a container bus within said housing to receive printer operation information from a printer controller for the printer in which the housing is installed;

electrical contacts coupled to said container bus within said housing; said electrical contacts for coupling the printer controller to the container bus so that the printer controller is enabled to send printer operation information to said electronic storage device in said housing;

a spring-biased ram for applying pressure to the solid ink mass to move a portion of the solid ink block to the heater for melting; and a rheostat coupled to the spring-biased ram, the rheostat being used to detect a low ink level in the container.

3. The supply container of claim 2 further comprising:

a filter for filtering the liquefied ink before the liquefied ink is transported from the container through the outlet port.

4. A system for supplying solid ink to a solid ink printer comprising:

a solid ink supply container adapted for use with solid ink printers, said container comprising:

a housing for installation in a solid ink printer, a solid ink block being stored within the housing, said housing being coupled to at least one printhead;

a heater within said housing, said heater liquefying within the housing the solid ink block;

a fluid outlet port through a wall of said housing, the liquefied ink being transported through the fluid outlet port to said at least one printhead;

an electronic storage device within said housing, said electronic storage device for storing printer operation information transferred by a printer controller external to said ink supply container; and electrical contacts attached to said housing; said electrical contacts for coupling said electronic storage device to said printer controller to receive printer operation information from said printer controller. The system of claim 3, wherein said supply container further comprises:

a spring-biased ram for urging said solid ink block to the heater so that the heater melts a portion of the ink block contacting the heater; and a rheostat coupled to the spring-biased ram, said rheostat detecting the a level of ink in said housing.

5. The system of claim 4 the container further comprising:

a filter for filtering the liquid ink before transferring the liquid ink to the printhead through the outlet port.

6. The system of claim 5 the container further comprising:

a replaceable top for providing access to the container for replacement of the solid ink block.

* * * * *